United States Patent
Gooding

(12) 
(10) Patent No.: US 6,504,989 B1
(45) Date of Patent: Jan. 7, 2003

(54) OPTICAL EQUIPMENT AND METHODS FOR MANUFACTURING OPTICAL COMMUNICATIONS EQUIPMENT FOR NETWORKS

(75) Inventor: Phillip H. Gooding, Mountain View, CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/757,702

(22) Filed: Jan. 11, 2001

Related U.S. Application Data

(60) Provisional application No. 60/242,148, filed on Oct. 23, 2000.

(51) Int. Cl.$^7$ .............................. G02B 6/00; G02B 6/36
(52) U.S. Cl. ........................................ 385/135
(58) Field of Search ................. 385/135, 134; 359/337

(56) References Cited

U.S. PATENT DOCUMENTS

| | | | |
|---|---|---|---|
| 5,253,104 A | | 10/1993 | Delavaux ..................... 359/341 |
| 5,402,515 A | * | 3/1995 | Vidacovich et al. ........ 385/135 |
| 5,457,763 A | * | 10/1995 | Kerry et al. ................ 385/134 |
| 5,861,981 A | | 1/1999 | Jabr ........................... 359/341 |
| 5,933,552 A | | 8/1999 | Fukushima et al. ........... 385/24 |
| 5,946,440 A | * | 8/1999 | Puetz .......................... 385/135 |
| 5,969,834 A | | 10/1999 | Faber et al. ................. 359/110 |
| 6,016,213 A | | 1/2000 | Farber et al. ................ 359/177 |
| 6,061,171 A | | 5/2000 | Taylor et al. ................ 359/341 |
| 6,115,174 A | | 9/2000 | Grubb et al. ................ 359/334 |
| 6,144,792 A | * | 11/2000 | Kim et al. ................... 385/135 |
| 6,151,157 A | | 11/2000 | Ball et al. .................... 359/341 |
| 6,160,659 A | | 12/2000 | Kinoshita .................... 359/337 |
| 6,198,570 B1 | | 3/2001 | Fukushima et al. ......... 359/337 |
| 6,215,581 B1 | | 4/2001 | Yadlowsky .................. 359/337 |
| 6,215,938 B1 | * | 4/2001 | Reitmeier et al. .......... 385/134 |
| 6,330,390 B1 | * | 12/2001 | Wislinski .................... 242/174 |

FOREIGN PATENT DOCUMENTS

| | | |
|---|---|---|
| EP | 762 667 A2 | 3/1997 |
| JP | 11-275027 A2 | 8/1999 |
| WO | WO 97/28584 | 8/1997 |
| WO | WO 99/66607 | 12/1999 |
| WO | WO 99/67609 | 12/1999 |
| WO | WO 00/4613 A1 | 1/2000 |
| WO | WO 00/14909 | 3/2000 |
| WO | WO 00/49721 | 8/2000 |

OTHER PUBLICATIONS

Zhu et al. "1.28 Tbit/s (32 ×40 Gbit/s) Transmission over 1000 km NDSF Employing Distributed Raman Amplification and Active Gain Flattening" Electronics Letters, vol. 37, No. 1, pp. 43–45 (Jan. 4, 2001).

Ono et al. "Automatic Gain Control in Silica–Based EDFA with over 50nm Flat Gain Bandwidth using an all Optical Feedback Loop" $10^{th}$ Optical Amplifiers and their Applications Technical Digest, Jun. 9–11, 1999.

Takeda et al., "Active Gain Tilt Equalization by Preferentially 1.43$\mu$m–or 1.48$\mu$m–Pumped Raman Amplification" OSA Optical Amplifiers and their Applications, vol. 30, p. 101–105 (1999).

\* cited by examiner

*Primary Examiner*—Brian Sircus
*Assistant Examiner*—Michael C. Zarroli
(74) *Attorney, Agent, or Firm*—Fish & Neave; G. Victor Treyz

(57) ABSTRACT

Optical equipment and methods for manufacturing optical equipment that allow equipment to be fabricated using fiber pigtails of various lengths are provided. An equipment housing may be used that has fiber channels. Optical components fibers of various lengths may be spliced together during manufacturing. The lengths of fiber may be routed through the fiber channels. Different paths may be taken through the channels to accommodate different fiber lengths. The equipment housing may include electronics boards for electrical components and an optical tray for mounting optical components with fibers. The fiber channels may be formed as part of the optical tray.

1 Claim, 7 Drawing Sheets

OPTICAL EQUIPMENT AND METHODS FOR MANUFACTURING OPTICAL COMMUNICATIONS EQUIPMENT FOR NETWORKS

This application claims the benefit of provisional patent application No. 60/242,148, filed Oct. 23, 2000.

BACKGROUND OF THE INVENTION

This invention relates to optical communications networks, and more particularly, to optical equipment for such networks and methods for manufacturing optical equipment.

In optical networks that use wavelength division multiplexing, multiple wavelengths of light are used to support multiple communications channels on a single fiber. Multi-kilometer fiber optic links may be used to interconnect network nodes. The optical equipment that is used in optical networks includes devices such as transmitters, receivers, add/drop modules, routers, and optical amplifiers and other components. The optical equipment may be mounted in racks or other housings at network nodes.

Each optical device typically includes a number of optical components. For example, optical amplifiers typically include components such as wavelength division multiplexing couplers, taps, splitters, laser pumps, filters, and attenuators. These components are typically supplied with fiber pigtails. In fiber amplifiers, lengths of fiber are used to provide optical gain. The lengths of fiber are typically formed into coils for mounting in an amplifier housing. The fiber on each coil is typically many meters in length.

The pigtailed optical amplifier components and fiber are spliced together during the process of assembling the optical amplifier. With conventional optical amplifier housing arrangements, fibers and pigtails may need to be cut to precise lengths before splicing to avoid packaging problems associated with handling fibers and pigtails of different lengths. The process of cutting fibers and pigtails to precise lengths may be time consuming and may make it difficult or impossible to rework defective splices during manufacturing.

It is therefore an object of the present invention to provide optical equipment arrangements and methods for manufacturing optical equipment that facilitate the handling of optical components having fiber pigtails of various lengths.

SUMMARY OF THE INVENTION

This and other objects of the invention are accomplished in accordance with the principles of the present invention by providing optical equipment arrangements and methods for manufacturing optical equipment that allow equipment to be fabricated using fiber pigtails of various lengths.

An equipment housing may be provided that has fiber channels. Fibers of various lengths may be produced when the fiber pigtails of optical components are spliced together during manufacturing. The various lengths of fiber may be routed through the fiber channels. Different paths may be taken through the channels to accommodate different fiber lengths.

The equipment housing may include electronics boards for electrical components and an optical tray for mounting optical components with fibers. The optical tray may be formed of a metal or other suitable materials. The fiber channels may be formed as part of the optical tray.

The fiber channel arrangement on the optical tray may involve an oval raceway, component mounting slots, and shortcut paths from the raceway through the component mounting slot area. The shortcut paths may be used to accommodate fibers of different lengths. When optical components are mounted in the component mounting slots, the shortcut path channels guide and protect the fiber pigtails attached to the components.

The component mounting slots may be configured to accommodate either short and wide components or long and narrow components or may be configured to accommodate both short and wide components and long and narrow components.

Overhangs or other suitable protruding portions of the optical tray may be provided in the vicinity of the oval raceway. The overhangs or other protruding portions may be used to help confine optical fiber during and after the assembly process.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
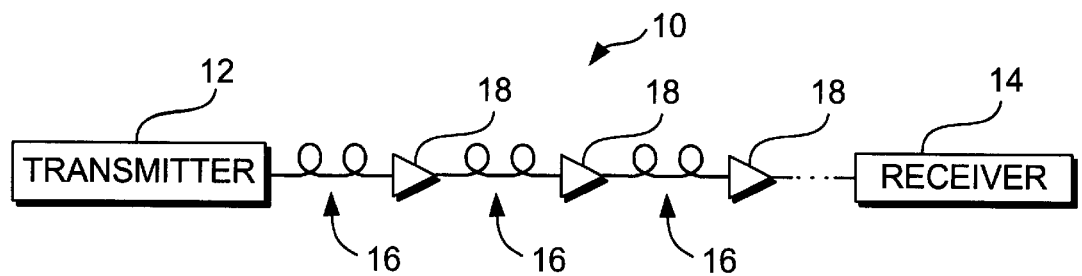
FIG. 1 is a schematic diagram of an illustrative optical communications link in accordance with the present invention.

An illustrative optical communications link 10 in accordance with the present invention is shown in FIG. 1. A transmitter 12 may transmit information to a receiver 14 over a series of fiber links. Each fiber link may include a span 16 of optical fiber. Fiber spans may be on the order of 40–120 km in length for long-haul networks or may be any other suitable length for use in signal transmission in an optical communications network.

As optical signals travel along the optical fibers 16, signal strength is attenuated. Optical amplifiers 18 may therefore be used to amplify the optical signals between successive spans of fiber.

The communications link of FIG. 1 may be used to support optical communications networks with wavelength-division-multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1530–1560 nm. These are merely illustrative system characteristics. If desired, more channels may be provided (e.g., hundreds of channels), signals may be modulated at higher data rates (e.g., approximately 40 Gbps for OC-768), or a wider range of carrier wavelengths may be supported (e.g., 1480–1610 nm).

The present invention relates to arrangements for mounting optical components in optical equipment such as transmitters, receivers, amplifiers, add/drop modules, routers, or any other suitable optical network equipment. For clarity, the present invention will be described primarily in connection with optical equipment such as optical amplifiers. This is, however, merely illustrative. The present invention relates to any suitable optical equipment.

Figure 2:
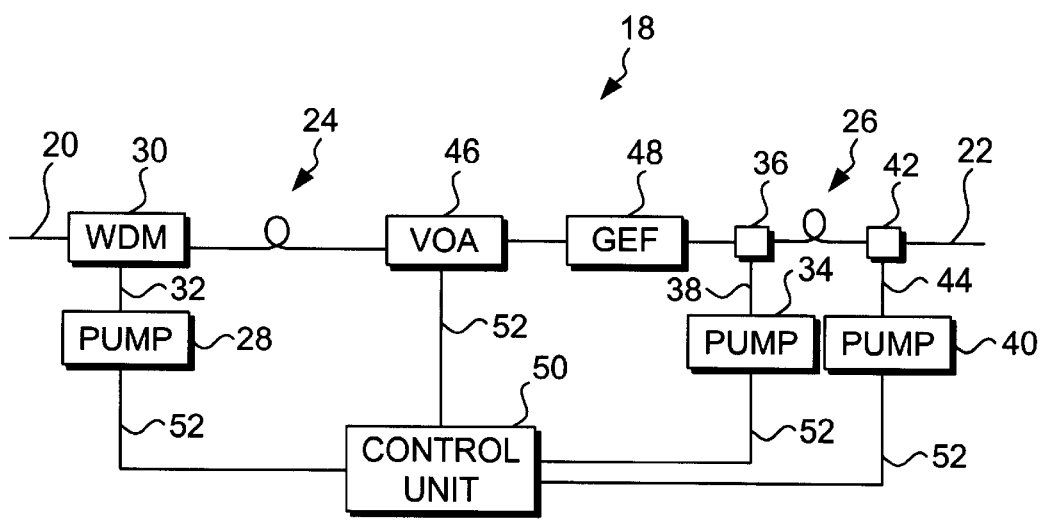
FIG. 2 is a schematic diagram of an illustrative optical amplifier in accordance with the present invention.

An illustrative optical amplifier in accordance with the present invention is shown in FIG. 2. Optical input signals from a span of transmission fiber 16 in link 10 may be provided to input 20. Optical output signals for the next span of transmission fiber in the optical communications link are provided at output 22. The optical input signals at input 20 may include signals at each of the wavelengths used to transmit data along the link.

Optical gain may be provided using rare-earth-doped fiber coils such as fiber coils 24 and 26. The rare-earth-doped fiber coils may be erbium-doped fiber coils. In the simplified example of FIG. 2, there are only two fiber coils. This is, however, merely illustrative. Amplifier 18 may have one, two, three, four, five, or more fiber coils. Amplifier 18 may also use optical amplifier stages based on semiconductor optical amplifiers or Raman amplifier stages or other amplifier components if desired.

Fiber coil 24 may be pumped using an optical pump 28. Light from pump 28 may be coupled into coil 24 using wavelength division multiplexing (WDM) coupler 30. Fiber 32 may be used to provide pump light from pump 28 to coupler 30.

Fiber coil 26 may be pumped using an optical pump 34. Light from pump 34 may be coupled into coil 26 using WDM coupler 36. Fiber 38 may be used to provide pump light from pump 34 to coupler 36. Fiber coil 26 may also be pumped using optical pump 40. Light from pump 40 may be coupled into coil 26 using WDM coupler 42. Fiber 44 may be used to provide pump light from pump 40 to coupler 42.

Pumps such as pumps 28, 34, and 40 may be laser diode pumps operating at, for example, 980 nm or 1480 nm or any other suitable pump wavelengths.

Amplifier 18 may also have optical components such as variable optical attenuator 46 and gain equalization filter 48. A control unit 50 may be used to control the operation of amplifier components using electrical paths 52. Control unit 50 may be based on a microprocessor or other suitable control electronics.

The schematic diagram of FIG. 2 shows an illustrative amplifier design and is somewhat simplified to avoid overcomplicating the drawing. A typical amplifier 18 may include many electrical and optical components in addition to or instead of the illustrative components shown in FIG. 2.

Figure 3:
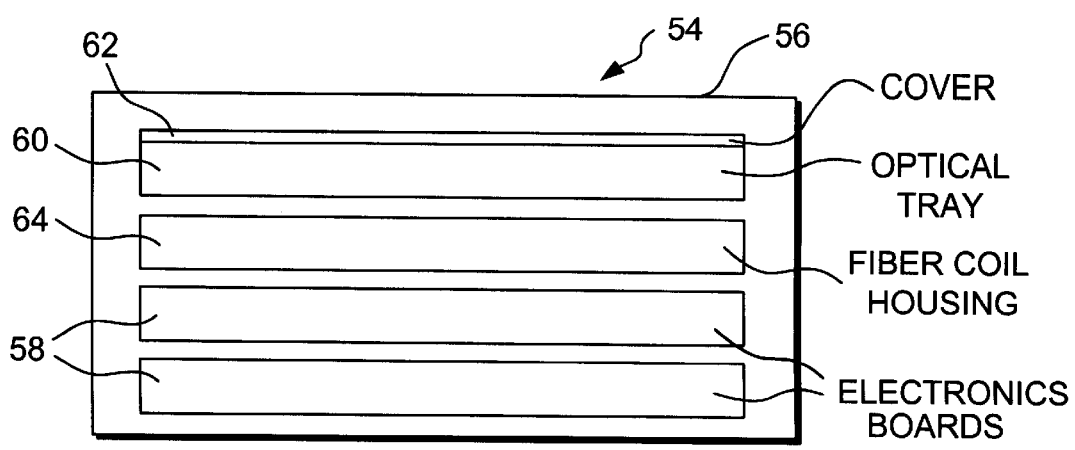
FIG. 3 is a schematic diagram of an illustrative optical amplifier housing arrangement in accordance with the present invention.

The various optical and electrical components of amplifier 18 may be mounted in a housing of the type shown in FIG. 3. Housing 54 may have a case 56. Case 56 may be, for example, a perforated metal case. Electrical components may be mounted in case 56 using electrical boards 58. Boards 58 may be printed circuit boards.

A fiber coil housing 64 may be used to house rare-earth-doped fiber coils. If desired, fiber coil housing 64 may be a temperature-controlled housing or module. The fiber coils in housing 64 may be several meters to many meters in length. Fiber coil housing 64 may be a metal-enclosed housing with fiber entrance and exit ports.

An optical tray 60 may be used to house optical components. A cover 62 may be used to hold components in tray 60. Cover 62 may be made of metal and may have a foam lining. Tray 60 may be formed from any suitable material. As an example, tray 60 may be formed from a metal. A metal having a relatively high thermal conductivity such as copper may be helpful in conducting heat away from boards 58 to an heatsink. The high thermal conductivity may also assist in maintaining the optical components on tray 60 at a uniform temperature.

Figure 4:
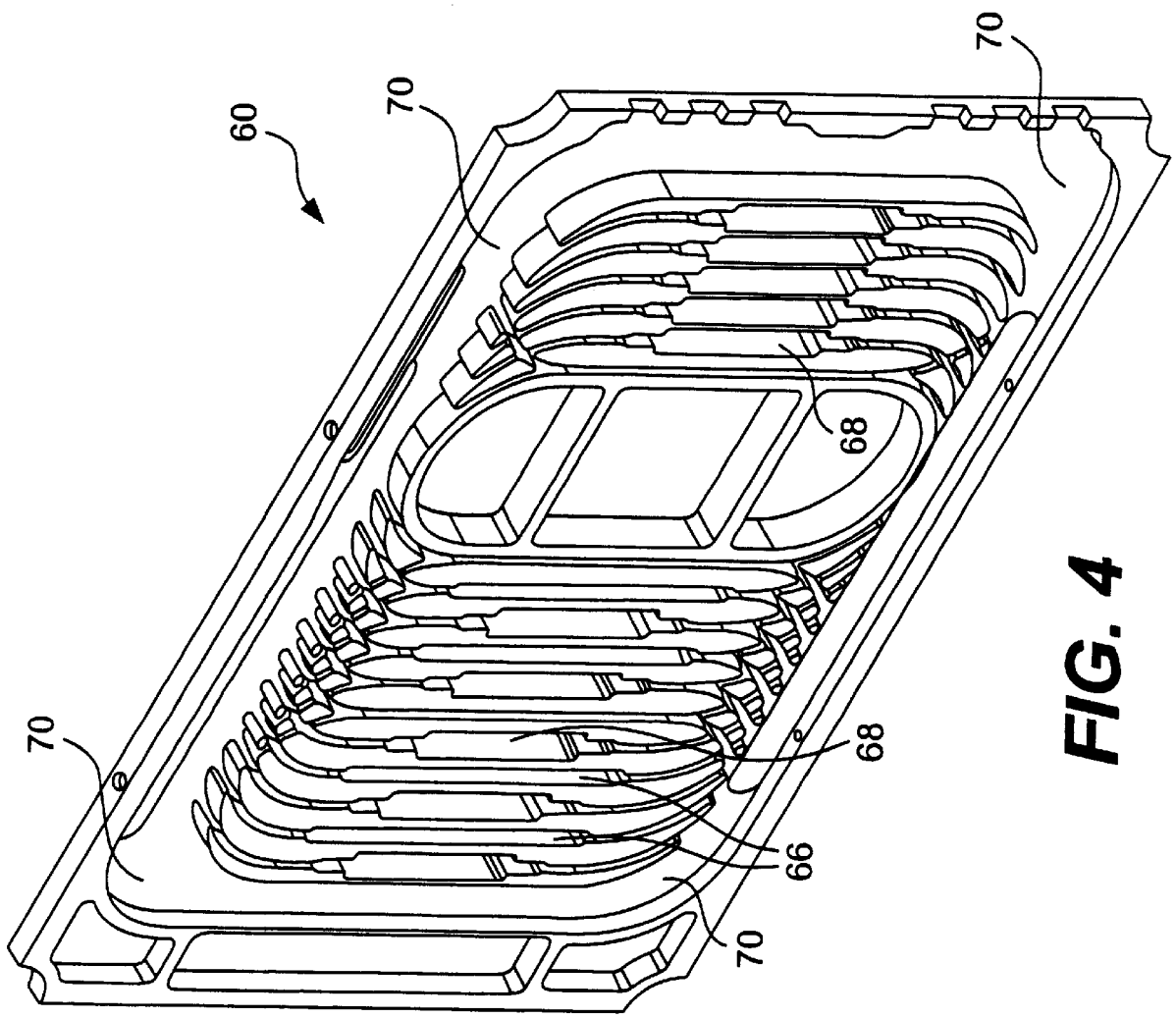
FIG. 4 is a perspective view of an illustrative optical amplifier optical tray in accordance with the present invention.

An illustrative optical tray 60 is shown in FIG. 4. Optical components may be mounted in slots 66 and slots 68. If desired, slots 66 and 68 may be sized to accommodate optical components that are packaged in commonly-used packages. For example, slots 66 may be sized to accommodate optical components packaged in 3 mm diameter cylindrical packages (long and thin components) and slots 68 may be sized to accommodate optical components packaged in 5.5 mm diameter cylindrical packages (short and wide components). This is, however, merely illustrative. Slots 66 and 68 may be any suitable size for mounting optical components. For example, slots 66 and 68 may be configured to accommodate non-cylindrical components.

The optical components that are mounted into slots 66 and 68 are typically fiber pigtailed. Tray 60 may have an outer raceway 70 into which the fibers from the components may be placed. With one approach, optical components are mounted into slots 66 and 68 and the fiber pigtails of the optical components are spliced together. The spliced fiber is then placed in raceway 70. Cover 62 is mounted on top of tray 60. Tray 60 and cover 62 are mounted in housing 54.

The optical components of FIG. 4 are spliced together with the fiber coils that are mounted in housing 64. A slot 82 or other suitable passageway may be used to allow the fiber ends from the coils in housing 64 to be connected to the fiber pigtails of the components mounted in slots 66 and 68.

Figure 5:
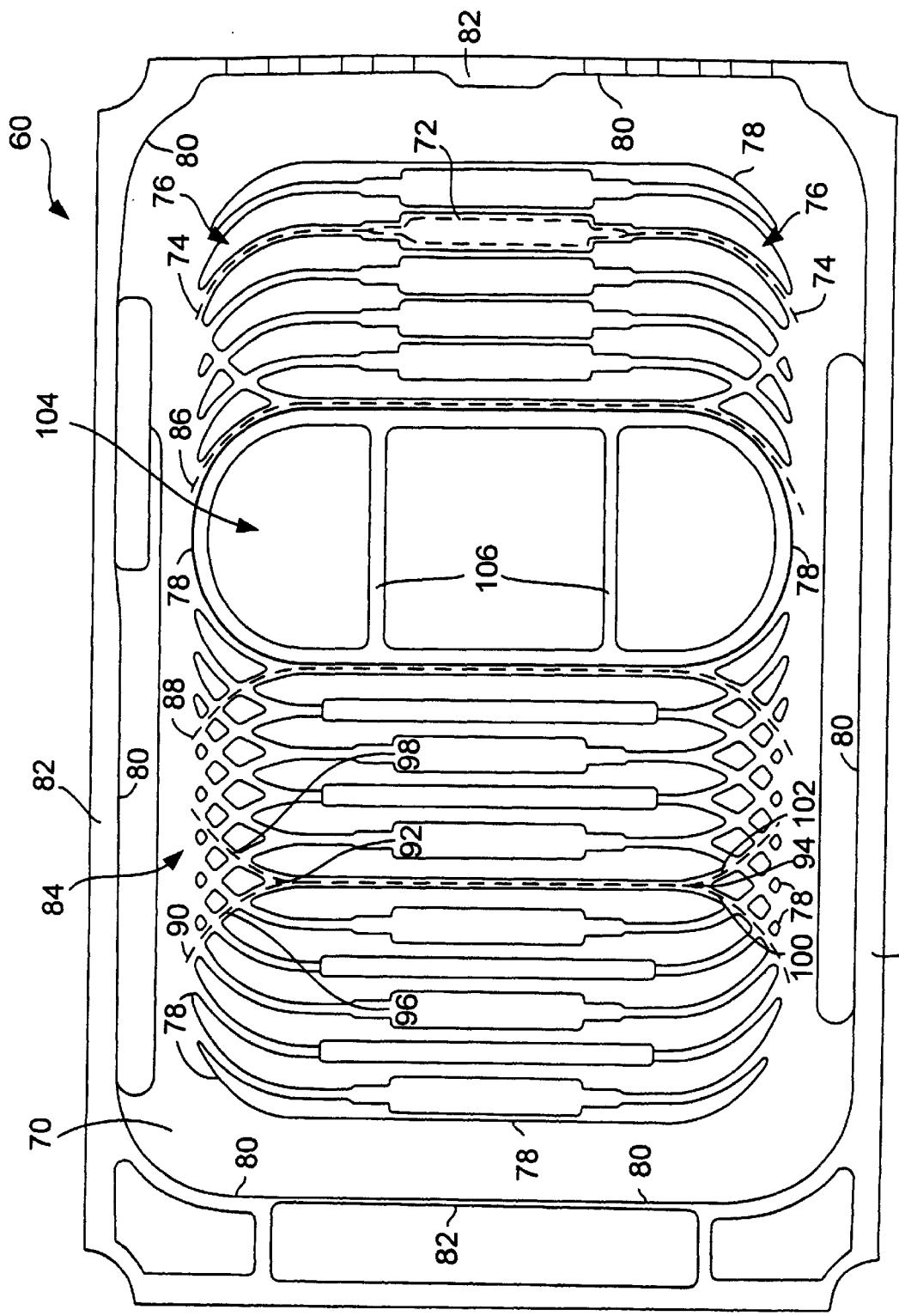
FIG. 5 is a top view of an illustrative optical amplifier optical tray in accordance with the present invention.

A dotted outline 72 showing how an illustrative optical component may be mounted in tray 60 is shown in FIG. 5. The fiber pigtails from this component may be placed in fiber pigtail channels 76 as shown by dotted lines 74. The ends of the fiber pigtails that exit A channels 76 may be placed in raceway 70.

The inner boundary of raceway 70 is defined by the outer edges 78 of the component-holding portion of tray 60. The outer boundary of raceway 70 is defined by the inner edges 80 of the tray sides 82. The width of raceway 70 provides leeway when laying lengths of fiber in raceway 70. If a fiber being laid in raceway 70 is somewhat longer than the nominal path length of raceway 70, the fiber may be accommodated by placing it near to the outer edge of raceway 70. If a fiber being laid in raceway 70 is somewhat shorter than the nominal path length of raceway 70, the fiber may be accommodated by placing it near to the inner edge of raceway 70. Long fibers may be accommodated by making more than one turn around raceway 70.

If a fiber is too long or too short to fit within the confines of raceway 70, shortcut paths through the central component-mounting region 84 of tray 60 may be used. For example, fiber that is being wound around raceway 70 that is slightly too short to fit within raceway 70 may be accommodated by passing it through shortcut path 86. Shortcut path 88 may be used to accommodate fiber that is too short to fit within raceway 70 when shortcut path 86 is being used. Shortcut path 90 may be used to accommodate fiber that is too short to fit within raceway 70 when shortcut path 88 is being used.

The fiber paths in tray 60 may be configured so that fiber is not subjected to excessively small bend radii.

Some of the fiber paths in component-mounting region 84 may branch into two paths. For example, the portion of path 90 between points 92 and 94 may form Y-branches at points 92 and 94. At point 92, the path may branch into paths 96 and 98. At point 94, the path may branch into paths 100 and 102. Using fiber channels with double-ended Y-branches allows fiber from raceway 70 to enter the branched channels from either the right or the left end of region 84.

Region 84 may have one or more empty regions 104. This reduces the weight of tray 60. The empty regions 104 may be used as pass-throughs for fiber and wire and may help accommodate protruding portions of components mounted in planes other than the plane of tray 60. Bars 106 may be used to add rigidity to empty regions 104.

The dimensions of raceway 70 and the shortcuts through region 84 of tray 60 may be selected so that various different fiber lengths may be accommodated without difficulty. Being able to handle a wide variety of fiber lengths is advantageous, because it is not always possible to predict the lengths of fiber that will need to be accommodated for a given amplifier design. For example, unless the fiber pigtails are cut to precise lengths before splicing, the exact amount of fiber that needs to be placed into raceway 70 and the other fiber channels of tray 60 may not be known.

Figure 6:
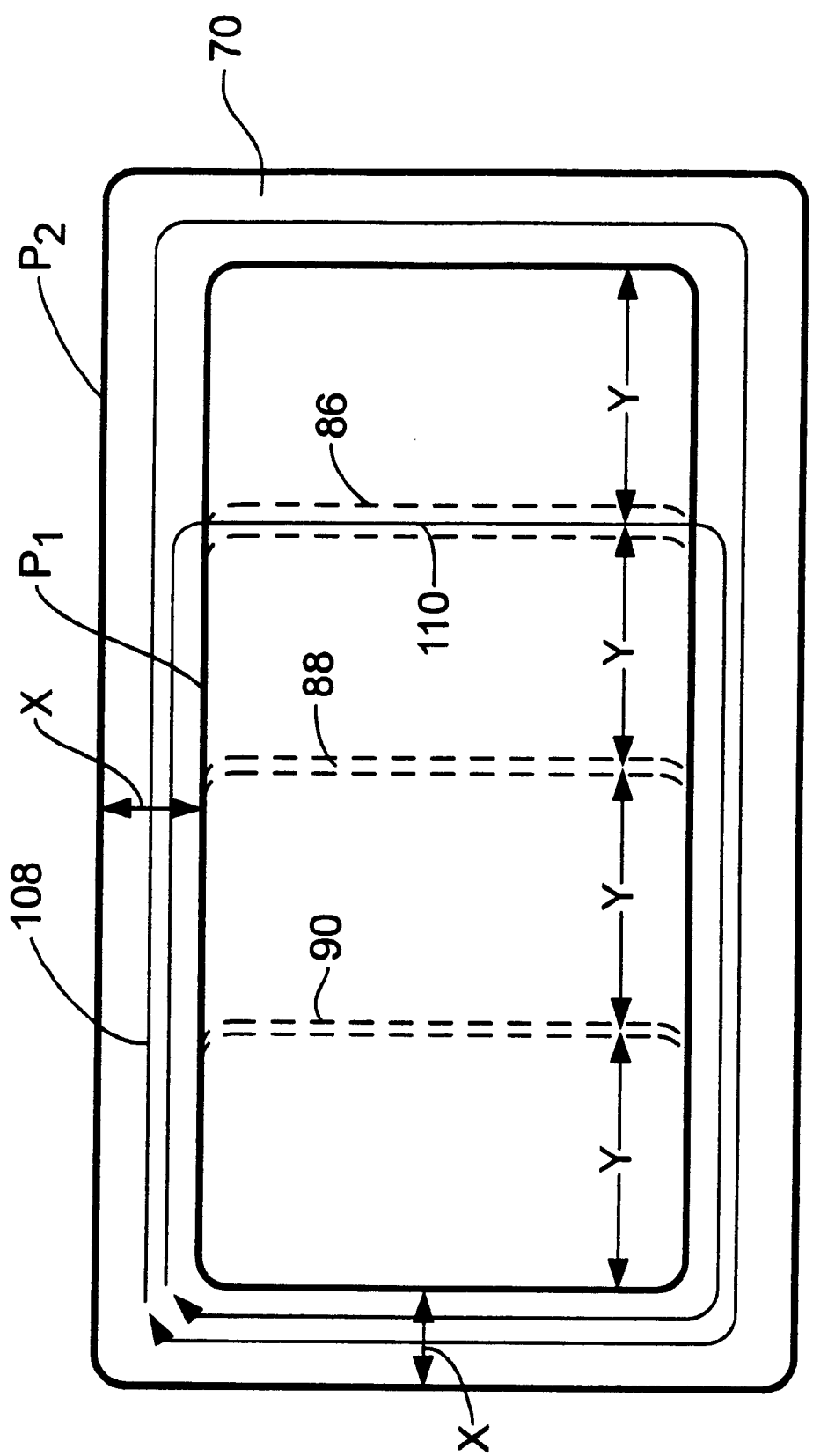
FIG. 6 is a schematic diagram showing the dimensions for an illustrative optical tray configuration in accordance with the present invention.

An illustrative layout for raceway 70 and the fiber channel shortcuts through region 84 is shown in FIG. 6. Raceway 70 may have an outer perimeter of length $P_2$ and an inner perimeter of length $P_1$. This arrangement allows raceway 70 to accommodate fibers with lengths between $P_1$ and $P_2$. An illustrative path that a fiber in raceway 70 may take is shown by path 108 of FIG. 6.

Fibers that are slightly less than $P_1$ in length may be routed through shortcut 86. An illustrative path that a fiber may take when passing through shortcut 86 is shown by path 110 of FIG. 6.

The longest single pass of fiber that may be accommodated when a fiber passes through shortcut 86 has a length of $P_1-2Y+6X$. The length of the inner perimeter of the shortened raceway is $P_1-2Y$. The extra length $6X$ may be obtained when the fiber is placed at the farthest possible radial distance from the center of the racetrack without exceeding the boundaries of racetrack 70.

Optical tray 60 may be configured so that the maximum length of fiber that may be accommodated using shortcut 86 ($P_1-2Y+6X$) is equal to or greater than the shortest length of fiber that may be accommodated when using raceway 70 without shortcuts ($P_1$). This condition may be obtained when $Y=3X$. As an example, $X$ may be 0.5 inches and $Y$ may be 1.5 inches. When $Y=3X$, fiber lengths less than $P_2$ but greater than $P_1$ may be accommodated using raceway 70 and no shortcuts. Fiber lengths of less than $P_1$ but greater than $P_1-2Y$ may be accommodated using raceway 70 and shortcut 86.

As shown in FIG. 6, shortcuts 88 and 90 may also be spaced apart by a distance $Y$. This allows fiber lengths of less than $P_1-2Y$ but greater than $P_1-4Y$ to be accommodated using shortcut 88 and allows fiber lengths of less than $P_1-4Y$ but greater than $P_1-6Y$ to be accommodated using shortcut 90.

The configuration of FIG. 6 is merely illustrative. For example, wider or narrower raceways may be used. A larger or smaller number of shortcuts may be used. Shortcuts may or may not have Y-branch configurations. Shortcuts may or may not pass through a component-mounting region.

Moreover, integral multiples of the fiber lengths that can be accommodated by raceway 70 and shortcuts 96, 88, and 90 in a single pass may be accommodated using multiple turns. Fiber may also be placed in the fiber channels of tray 60 using any suitable combination of paths. For example, a fiber may be laid in a path that initially passes around raceway 70 without using any shortcuts and that then passes around raceway 70 and through shortcut 86.

Figure 7:
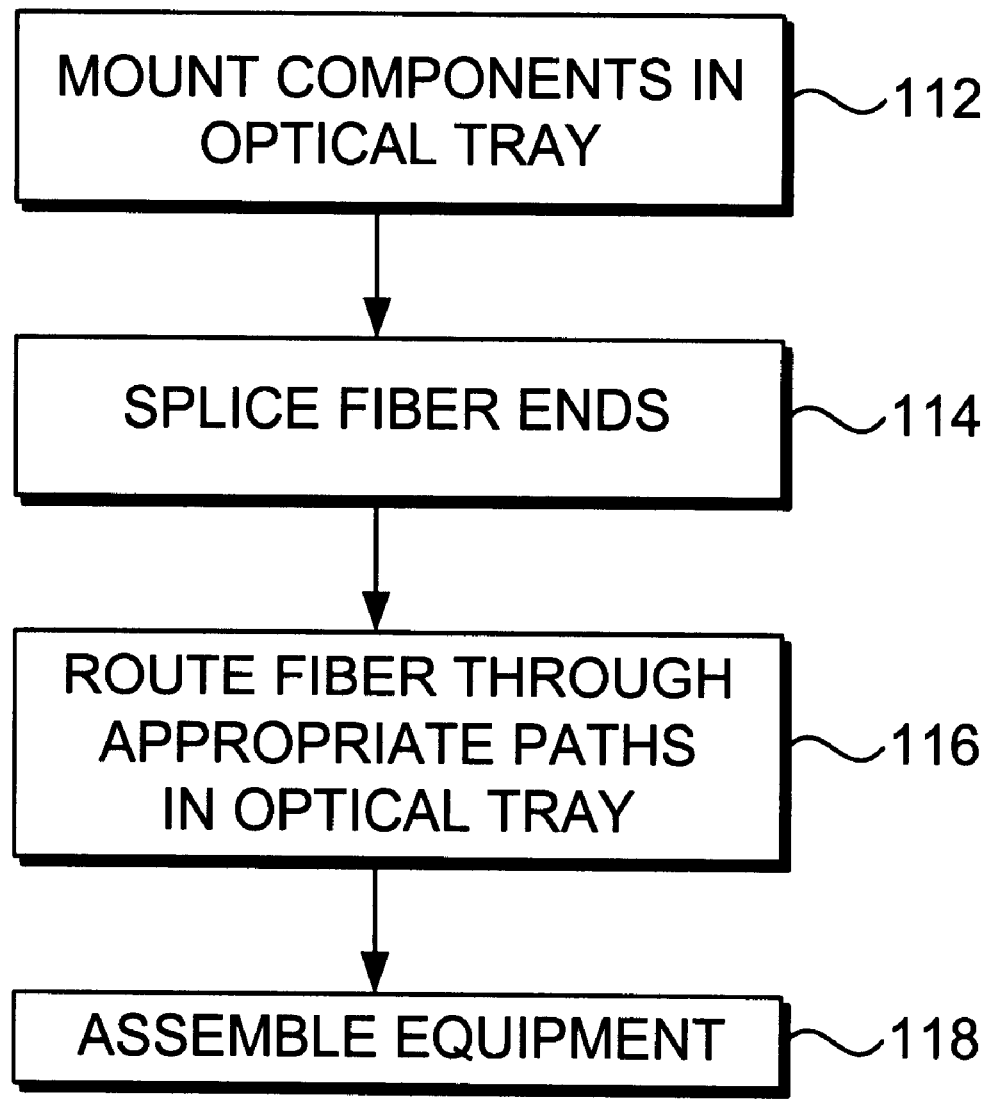
FIG. 7 is a flow chart of illustrative steps involved in manufacturing optical equipment using an optical tray in accordance with the present invention.

Illustrative steps involved in manufacturing optical equipment using an optical component mounting arrangement such as the arrangement of FIGS. 4–6 are shown in FIG. 7. At step 112, optical components for the optical equipment may be mounted in an optical component housing such as tray 60. Slots such as slots 66 and 68 may be large enough to accommodate optical components in common package sizes. If there is extra space surrounding the components mounted in slots 66 and 68, spacers (e.g., plastic spacers) may be used to prevent the components from shifting within the slots. Adhesive for securing the components may be used in combination with spacers or in place of spacers if desired.

The optical components that are mounted in the optical tray may have pigtailed optical fibers. The fibers may be secured with holders at the station at which the optical equipment is being assembled. An operator may use a manual fiber splicer (e.g., a fusion splicer) or automated fiber splicing equipment may be used to splice the ends of the fiber pigtails together. The fiber pigtails may be trimmed to precise lengths before splicing or may be roughly trimmed to certain desired lengths. If desired, the ends of the fiber pigtails may be spliced together without making any significant length adjustments to the fiber ends prior to splicing. After at least one splice has been formed, the loose fiber in the optical equipment may be routed through the appropriate fiber channels on tray 60.

In particular, automated fiber handling equipment or an assembly technician may route the spliced fiber through the appropriate paths in optical tray 60 at step 116. The fiber that is being placed in the fiber channels of tray 60 is generally a length of fiber that optically joins two optical components. For example, the fiber may be a length of fiber between an attenuator such as attenuator 46 and a filter such as filter 48. The length of fiber generally contains at least one fiber splice. When fiber tray 60 is configured so that a wide range of fiber lengths may be accommodated, fibers may be routed along an appropriate fiber channel path without significant prior trimming or length adjustments.

At step 118, the assembly of the optical equipment may be completed. For example, optical tray 60 may be mounted in housing 54 and cover 62 may be placed on optical tray 60, as shown in FIG. 3.

Figure 8:
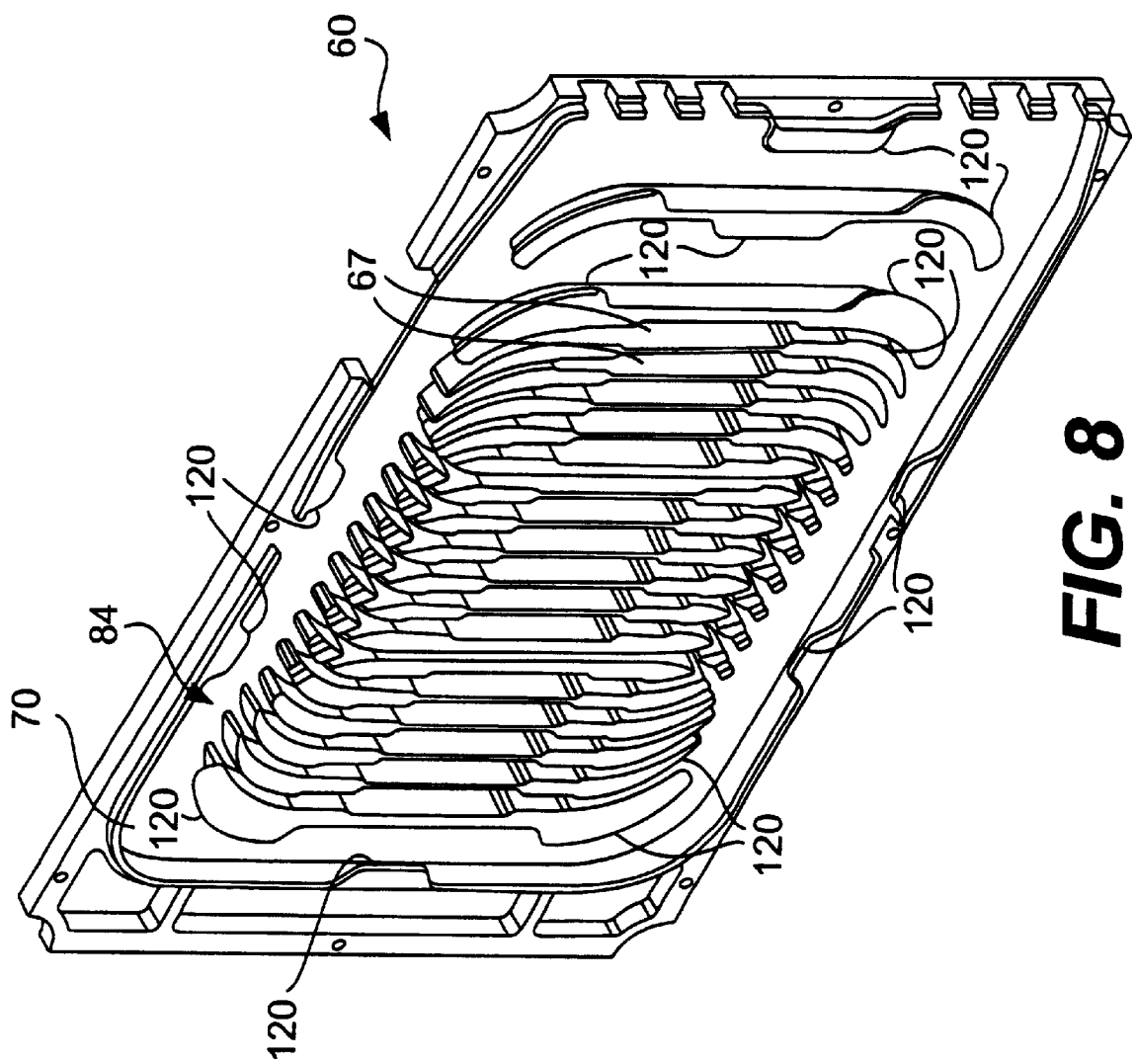
FIG. 8 is a perspective view of an illustrative optical tray having overhang portions in accordance with the present invention.

As shown in FIG. 8, optical tray 60 may have fiber confinement portions such as overhang portions 120. Portions 120 help to confine the optical fiber in tray 60 during the assembly process and after assembly is complete. The portions 120 may overhang raceway 70 and the shortcut paths in component mounting regions 84. Fiber confinement structures such as portions 120 may be formed as part of tray 60 or may be separate structures that are attached to tray 60.

Figure 9:
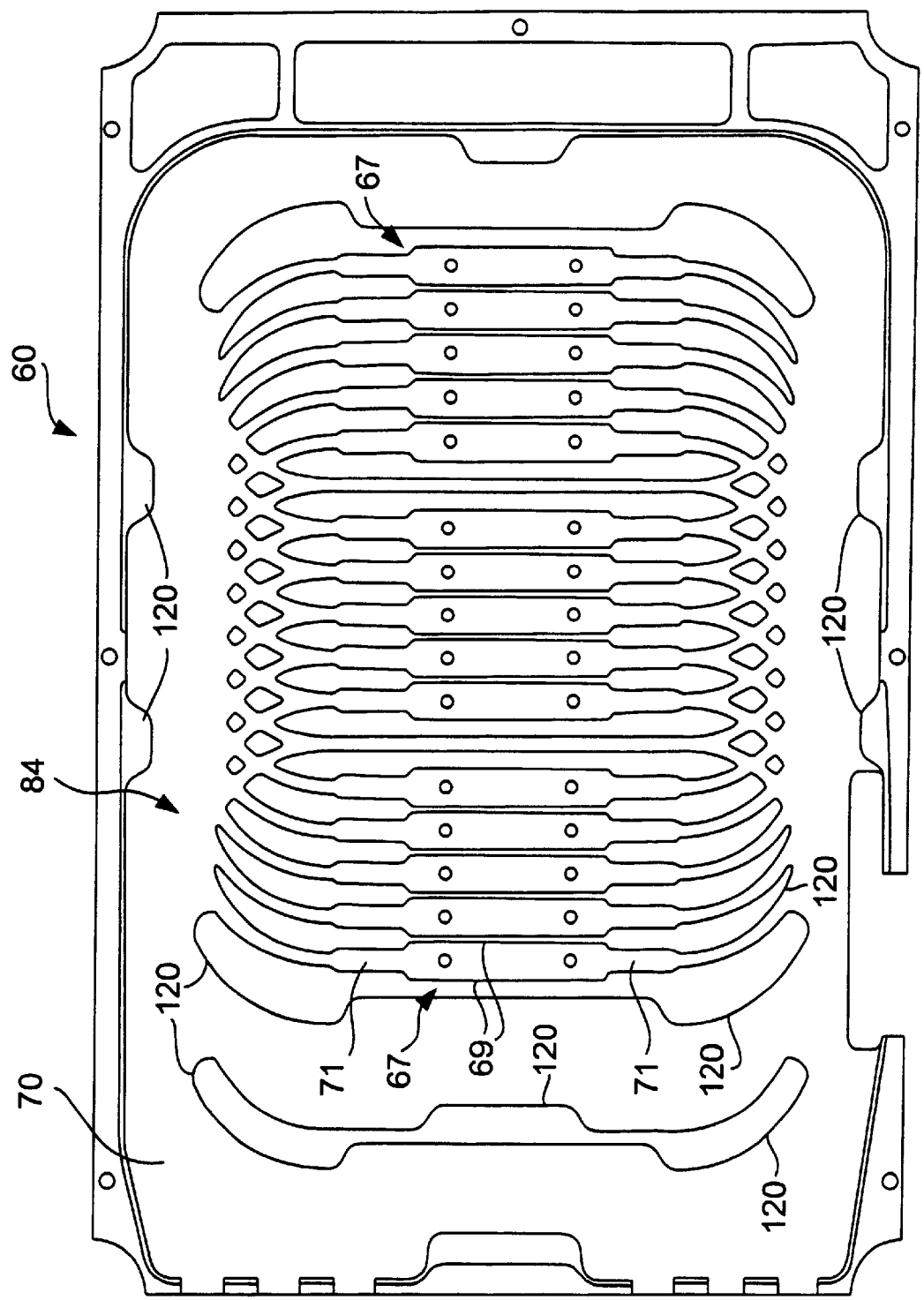
FIG. 9 is a top view of the illustrative optical tray of FIG. 8.

A top view of optical tray 60 of FIG. 8 is shown in FIG. 9. As shown in FIGS. 8 and 9, optical tray 60 need not have empty regions such as empty regions 104 of FIG. 5. Moreover, component mounting slots 67 may be provided that accommodate optical components in different-sized packages In the example of FIGS. 8 and 9, slots 67 are sized to accommodate optical components in both short and wide packages such as 5.5 mm diameter cylindrical packages and long and thin packages such as 3 mm diameter cylindrical packages. When a short and wide component is mounted in a slot 67, the body of the component is held by sidewalls 69 and the fiber pigtail is routed through the end portions 71. When long and narrow components are mounted in slots 67, the ends of the components are held by end portions 71.

It will be understood that the foregoing is merely illustrative of the principles of this invention, and that various modifications can be made by those skilled in the art without departing from the scope and spirit of the invention.

What is claimed is:

1. A method for fabricating optical equipment for fiber-optic communications networks, comprising:

mounting optical components in an optical tray having shortcut paths and a raceway coupled to the shortcut paths, wherein the optical components have fiber pigtails of various lengths;

splicing at least some of the fiber pigtails together; and routing the spliced fiber pigtails through the appropriate paths in the optical tray which comprises routing the spliced fiber pigtails through the shortcut paths and the along the raceway, and wherein the longest single pass of spliced fiber pigtail that may be accommodated when a spliced fiber pigtail passes through a shortcut path is equal to or greater than the shortest length of spliced fiber pigtail that may be accommodated when using the raceway without the shortcut paths.

* * * * *